June 7, 1927.
W. D. BOTTERBUSCH
CHICKEN FEEDER
Filed June 19, 1926
1,631,462
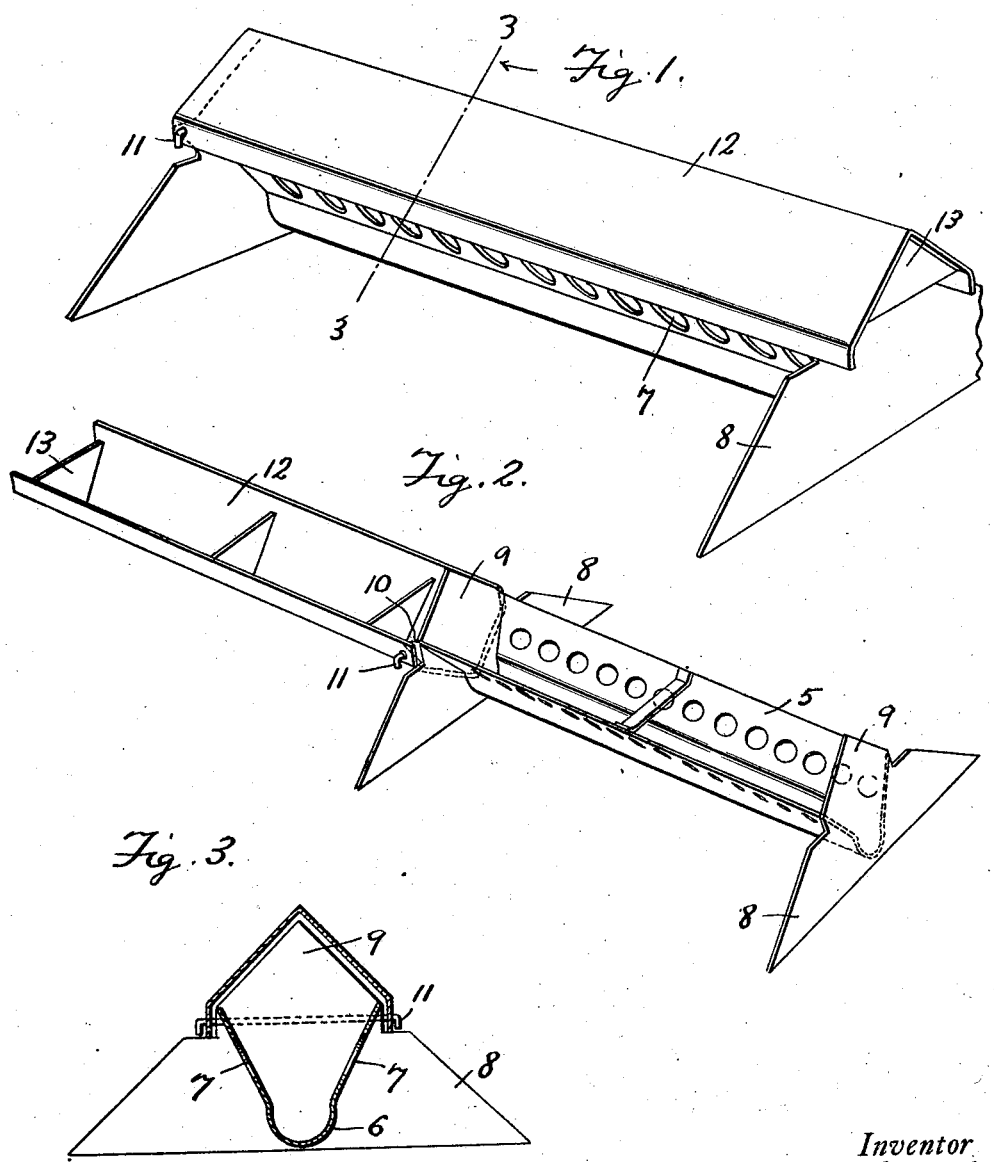
Inventor
William D. Botterbusch
By Clarence A. O'Brien
Attorney Patented June 7, 1927.

1,631,462

UNITED STATES PATENT OFFICE.

WILLIAM D. BOTTERBUSCH, OF BLUFFS, ILLINOIS.

CHICKEN FEEDER.

Application filed June 19, 1926. Serial No. 117,085.

This invention relates to improvements in chicken feeders, and its principal object is to provide a feeder that will accommodate a large number of chicks at one time, and that is so constructed as to be absolutely hen-proof, so as to prevent the waste of the feed.

An additional object of the invention is to provide a feeder of this character that is constructed to prevent the entrance of rain into the feed and also to prevent the chicks from placing their feet into the device and scratching the same therefrom.

A still further object is to provide a feeder wherein the same may be employed as a combination feed and water trough, should such a contingency arise.

A still further object is to provide a feeder particularly adapted for the feeding of chicks that is so constructed as to permit the same to be readily cleaned whenever necessary.

Other objects will become apparent as the nature of the invention is better understood, the same comprising the novel form, combination and arrangement of parts hereinafter more fully described, shown in the accompanying drawing, and claimed.

In the drawings wherein like reference characters indicate corresponding parts throughout the drawings:

Figure 1 is a perspective of the chicken feeder constructed in accordance with the present invention, Figure 2 is a perspective taken on a smaller scale, showing the feeder in open condition to permit the filling of the feed trough and also to permit the same to be employed as a combined feed and water trough, and Figure 3 is a transverse section taken substantially on the line 3—3 of Figure 1.

Now having particular reference to the drawing, my novel feature constitutes the provision of a feed trough 5 of suitable length and of general V-shape in cross section as clearly disclosed in Figure 3. The bottom wall of this trough is substantially rounded as at 6 for receiving the feed, while the front and rear side walls of the trough directly above the rounded bottom are provided with longitudinally spaced chick head openings 7 in order that access may be had to the feed therein.

Upon the opposite ends of said trough 5 are transversely extending wings 8—8, the lower edges of which are on a horizontal plane, so as to serve as supporting legs for the opposite ends of the trough. The ends of these wings taper inwardly from the lower edges thereof, while the upper edges of said wings are formed with pyramidal shaped tongues 9 within the opposite ends of the trough, the apices thereof extending somewhat above the open top side of the trough as clearly disclosed in Figures 2 and 3.

Pivoted to outwardly directed ears 10 at the opposite edges of one of the tongues 9, directly outwardly of the sides of the trough 5 and this by reason of a pivot pin 11, is one end of a trough lid 12, that is also of general V-shape in cross section, as disclosed in Figure 3.

The extreme edges of the lid side walls are non-inclined in order that the same will rest upon the upper edges of the trough wings 8—8 when the lid is moved to closed position as disclosed in Figures 1 and 3. The pyramidal tongues 9—9 of said wings will be disclosed within the lid 12 when the same is arranged upon the trough for closing the opposite ends thereof so as to prevent the entrance of dirt, water or other foreign matter into said trough.

The lid 12 is provided with a plurality of transverse partitions 13 for dividing the same into compartments thus permitting this lid to be employed for receiving a supply of feed or water should the necessity arise.

It will thus be seen that I have provided a highly novel, simple and efficient chicken feeder that is well adapted for all of the purposes heretofore designated, and even though I have herein shown and described the feeder as consisting of certain detail structural elements, it is nevertheless to be understood that some changes may be made without affecting the spirit and scope of the appended claims.

What I claim is:

In a feeder of the character described, a feed trough open at its top, a pair of apertured ears extending from one end of the feed trough in spaced parallel relation, a lid of substantial V-shaped cross section having parallel spaced flange edges, said apertured ears being received between the flange edges, and a pin piercing apertures in the flange edges and the apertures of the ears to hingedly mount the lid on the trough so that it may be disposed over the trough or in extension thereof in an open position at which time it may be utilized as a water trough, the lid being maintained in said horizontal open position by the abutment of one end of the said lid against the adjacent end of said trough.

In testimony whereof I affix my signature.

WILLIAM D. BOTTERBUSCH.